United States Patent
Praul et al.

(10) Patent No.: US 10,417,710 B2
(45) Date of Patent: Sep. 17, 2019

(54) APPARATUS, METHODS, SYSTEM AND FRAMEWORK FOR DISCOVERING, COPYING AND CURATING INVESTMENT PORTFOLIOS

(71) Applicant: The Stevens Institute of Technology, Hoboken, NJ (US)

(72) Inventors: Dylan Praul, Hoboken, NJ (US); Mukundan Iyengar, Jersey City, NJ (US); Marc Fields, Hoboken, NJ (US); Jimmy Dominkewicz, New York, NY (US)

(73) Assignee: THE TRUSTEES OF THE STEVENS INSTITUTE OF TECHNOLOGY, Hoboken, NJ (US)

(*) Notice: Subject to any disclaimer, the term of this patent is extended or adjusted under 35 U.S.C. 154(b) by 417 days.

(21) Appl. No.: 15/416,288

(22) Filed: Jan. 26, 2017

(65) Prior Publication Data
US 2017/0213290 A1    Jul. 27, 2017

Related U.S. Application Data

(60) Provisional application No. 62/287,691, filed on Jan. 27, 2016.

(51) Int. Cl.
*G06Q 40/06* (2012.01)
*G06Q 40/04* (2012.01)
*G06F 16/2457* (2019.01)

(52) U.S. Cl.
CPC ......... *G06Q 40/06* (2013.01); *G06F 16/2457* (2019.01); *G06Q 40/04* (2013.01)

(58) Field of Classification Search
CPC ..... G06F 16/2457; G06Q 40/04; G06Q 40/06
See application file for complete search history.

(56) References Cited

U.S. PATENT DOCUMENTS 8,458,085 B1 * 6/2013 Yakubov ............... G06Q 40/00
                                                                  705/35
8,775,296 B2   7/2014 Assia
(Continued)

FOREIGN PATENT DOCUMENTS

WO   WO-2015048181 A1 *  4/2015  ............. G06Q 40/06

OTHER PUBLICATIONS

Luukka, Pasi; Patari, Eero; Fedorova, Elena; Garanina, Tatiana. "Performance of Moving Average Trading Rules in a Volatile Stock Market: The Russian Evidence". Emerging Markets Finance and Trade 52.10: 2434-2450. Routledge Journals. Jan. 1, 2016. (Year: 2016).*

*Primary Examiner* — Kito R Robinson
*Assistant Examiner* — Abdulamajeed Aziz
(74) *Attorney, Agent, or Firm* — Greenberg Traurig, LLP

(57) ABSTRACT

The present disclosure relates to a system, apparatus and method through which novice or new investors can begin to invest by using the knowledge shared by seasoned investors, who are incentivized to do so by commissions based on their success. The system follows users through each point in a social investment process, and directs users in novel ways to execute a purchase faster. A user discovers other user portfolios through recommendations made using multi-stage collaborative portfolio filtering. From there, processes are defined for following and "mimicking" a portfolio to display the contents thereof, create personal copies of the portfolio or its strategies, and subscribe to periodic or timely updates on the portfolio. Through this system and processes, investment portfolios are curated, and metrics are created to rank user success and further refine recommendations.

17 Claims, 6 Drawing Sheets

(56) References Cited

U.S. PATENT DOCUMENTS

| | | | | |
|---|---|---|---|---|
| 2008/0270319 A1* | 10/2008 | Torabi | ............ | G06Q 10/10 |
| | | | | 705/36 R |
| 2011/0302105 A1* | 12/2011 | Yakubov | ............ | G06Q 40/00 |
| | | | | 705/36 R |
| 2013/0060672 A1* | 3/2013 | Assia | ............ | G06N 5/025 |
| | | | | 705/37 |
| 2013/0073620 A1* | 3/2013 | Ghosh | ............ | G06Q 30/00 |
| | | | | 709/204 |
| 2013/0191222 A1* | 7/2013 | Glodjo | ............ | G06Q 30/0269 |
| | | | | 705/14.66 |
| 2013/0268423 A1 | 10/2013 | Giles | | |
| 2014/0089161 A1* | 3/2014 | Robbins | ............ | G06Q 40/04 |
| | | | | 705/37 |
| 2014/0108293 A1* | 4/2014 | Barrett | ............ | G06Q 40/04 |
| | | | | 705/36 R |
| 2014/0188761 A1* | 7/2014 | Adams | ............ | G06Q 40/06 |
| | | | | 705/36 R |
| 2015/0228019 A1* | 8/2015 | Assia | ............ | G06Q 40/06 |
| | | | | 705/37 |
| 2015/0317733 A1* | 11/2015 | Chibly | ............ | G06Q 40/04 |
| | | | | 705/37 |
| 2015/0324918 A1* | 11/2015 | Ward | ............ | G06Q 40/06 |
| | | | | 705/36 R |
| 2015/0348188 A1* | 12/2015 | Chen | ............ | G06Q 40/04 |
| | | | | 705/37 |
| 2016/0055580 A1* | 2/2016 | Fox | ............ | G06Q 40/04 |
| | | | | 705/37 |

* cited by examiner

Cart
Mimic of Frivolous_bot's Portfolio [Cancel Mimic] ← 79

| Symbol | Price | Current Shares | Shares | Subtotal |
|---|---|---|---|---|
| BODY | $0.02 | 140000 | Sell 140000 | $-2800.00 |
| HERO | $3.69 | 0 | Buy 45091 | $166385.79 |
| CL | $65.57 | 2 | Sell 2 | $-131.14 |
| GILD | $106.74 | 0 | Buy 7 | $747.18 |
| MPO | $3.32 | 2500 | Sell 2500 | $-8300.00 |
| CHD | $86.3 | 50 | Sell 50 | $-4315.00 |
| JCP | $8.07 | 5 | Sell 5 | $-40.35 |
| PNRA | $182.62 | 10 | Sell 10 | $-1826.20 |
| | | | | Total: $149720.28 |

[Proceed to Checkout] ← 79B

FIG. 4

[Proceed to Checkout]  Total: $149720.28  ← 87

FIG. 5

APPARATUS, METHODS, SYSTEM AND FRAMEWORK FOR DISCOVERING, COPYING AND CURATING INVESTMENT PORTFOLIOS

CROSS REFERENCE TO RELATED APPLICATIONS

The present application claims the benefit of U.S. Provisional Application No. 62/287,691, filed Jan. 27, 2016, entitled, Apparatus, Methods, System and Framework for Discovering, Copying and Curating Investment Portfolios, which is incorporated by reference herein in its entirety for all purposes.

FIELD OF THE INVENTION

This disclosure relates to systems and methods for analyzing investment options, obtaining investment information, making investment decisions and implementing investing decisions by executing buy and sell orders, and in particular, conducting the investment activities using a computer and computer network.

BACKGROUND OF THE INVENTION

The currently accepted way to trade financial securities is to self-learn the value of an investment option by closely following news, reports and other sources of information with regards to that option. For example, before purchasing stocks, most buyers tend to read up on that company's profile on sites such as Investopedia and Yahoo Finance, as well as gauge the trends of rising and falling stock prices. Besides these online resources, most investors might take input from family and friends, or consult sell-side brokers at various banks to which they are customers. Novice investors may be overwhelmed by the volume of disparate available information and the process of determining exactly what stocks and other investments to buy. The amount of knowledge required to make informed investment choices may present a high barrier to investment for many potential investors.

There have been innovations in this domain, e.g. portals such as StockTwits will report on crowd "sentiment" of a particular stock by mining social media portals such as Twitter for activity regarding that particular stock/company. Such analyses have a way of reflecting the opinion of a general mass of people that goes above and beyond company reports and pricing trends found on Investopedia and/or Yahoo Finance. In addition, "Copy Trading and Method"—US 20130268423 A1 and "Social based automatic trading of currencies, commodities, securities and other financial instruments"—US 20130060672 A1 reflect other concepts applied to this field. Additional methods, systems and approaches to aid investors are therefore of interest in the investment field.

SUMMARY OF THE INVENTION

The present disclosure relates to an automated system for investing in financial securities useable by a plurality of users, having: a trader grouping graphical user interface displaying data fields to the plurality of users allowing entry of user data, including at least one of risk aversion, available trading capital and trading frequency; a trader grouping engine displaying the trader grouping graphical user interface to the plurality of users, receiving the user data entered, storing the user data in a user data database and comparing the user data between different users to ascertain a measure of similarity between a plurality of users and grouping at least two users based upon the measure of similarity between a first user and a second user; a trading graphical user interface displaying financial security identification and pricing information and fillable data entry blanks, including a blank for number of securities bought/sold that may be filled by the first user in making a buy/sell order; a trading engine displaying the trading graphical user interface to the first user, allowing the first user to enter trading data for a trade of financial securities, recording the trading data in a trading data database and executing the trade by communicating trading data associated with the trade to a trading agent capable of executing the trade for the first user, the trading engine recording data pertaining to the executed trade in the trading data database; a profit/loss calculation engine that calculates the profit/loss associated with at least one trade by the first user and stores the profit/loss data in the trading database; a trading activity reporting graphical user interface displayable on a display screen and reporting a first portion of the trading activity data including an identifier for the first user and at least one other data point descriptive of the trading activity of the first user; and a trading activity reporting engine that identifies a user of the plurality of users that has been grouped with the first user by the grouping engine as reflected in the user data database and displays the first portion of the trading activity data including an identifier for the first user and at least one other data point descriptive of the trading activity of the first user to at least one other user that has been grouped with the first user, the trading activity reporting graphical user interface presenting a message to the other user inviting the other user to express interest in receiving further data concerning the first user's trades and establishing a relationship between the first user and the other user in which the other user has access to the first user's trading data beyond the first portion of the trading activity data, the election of relationship represented by data stored in a relationship database, which is monitored by the system to control the sharing of the first user's trading data associated with subsequent trades with the other user.

In one embodiment, the relationship offered to the other user includes a relationship wherein the first user's trades are shown to the other user and the other user may selectively mimic the first user's trades and further including a trade mimicking engine, the trade mimicking engine presenting the first user's trades to the other user via a trade mimicking graphical user interface, which describes the first user's trade in terms of investment changes made during the trade, including identifying the financial securities traded along with the numbers of financial securities traded, the trade mimicking engine providing the option to the other user to mimic the first user's trade in whole or part and based upon the other user's selections executes the resultant trade for the other user.

In one embodiment, the first user's trade is optionally mimicked proportionally in making the other user's trade.

In one embodiment, the proportion is 1:1, such that the first user's portfolio and trades are mimicked entirely.

In one embodiment, the proportion is 0:1, such that the first user's portfolio and trades are not mimicked at all.

In one embodiment, the grouping engine utilizes pairwise correlation employing the Pearson coefficient ranging from −1 to 1, with −1 indicating no correlation and 1 indicating complete correlation.

In one embodiment, a plurality of other users can be mimicked by another user, such that the mimicked portfolio and trading activities are an amalgam of portfolios and trades.

In one embodiment, any given user can mimic any other given user or a plurality of other users.

In one embodiment, the system is accessed by a web portal.

In one embodiment, the system is accessed by a mobile application.

In one embodiment, the first portion of the trading data of the first user includes trading success.

In one embodiment, the first portion of the trading data of the first user includes the number of other users that are mimicking the trading of the first user.

In one embodiment, the grouping engine filters users grouped together by another metric from at least one of success rate or the number of users that the first user has an established relationship with.

In one embodiment, further including a broker connected to the system for executing trades.

In one embodiment, further including a bank connected to the system for dispensing funds to execute trades and receiving proceeds of trades.

In one embodiment, the trades are conducted without actual money.

In one embodiment, the relationship represented by data stored in the relationship database allows the other user to view the first user's trades but does not trigger the trade mimicking engine.

In one embodiment, further including a compensation engine that calculates compensation to the first user for trades conducted by other users who are in a mimicking relationship with the first user and who make trades that mimic the first user's trades.

In one embodiment, the first user's success E is calculated in accordance with the following equation, $$E(p,f,m,t)=A\Sigma_j S(p_j)+Bf+Cm+D*UE_{t-1}$$

where E is dependent on the first user's portfolios (p), the first user's current number of followers (f), and the first user's current number of mimicker's (m), and where S is a function for calculating a portfolio's moving average success, and A, B, C, and D are all constants which assign weights to each parameter.

In one embodiment, further including a notification engine, the notification engine generating a notification and trading data to other users that are in a relationship with the first user when the first user executes a trade.

BRIEF DESCRIPTION OF THE SEVERAL VIEWS OF THE DRAWINGS

FIG. 4 is a screen shot of a screen for displaying detailed portfolio information of an existing investor and participant in the system that is mimicked by another inventor and who is presented with fields for inputting desired number of shares to purchase for themselves along with calculated fields showing the cost implications of their inputs in accordance with an embodiment of the present disclosure.

FIG. 5 is a screen shot of a screen for displaying confirmation of securities by an investor in accordance with an embodiment of the present disclosure.

FIG. 7 is a flowchart of process steps on the server side of a method in

DETAILED DESCRIPTION OF THE INVENTION

Figure 1:
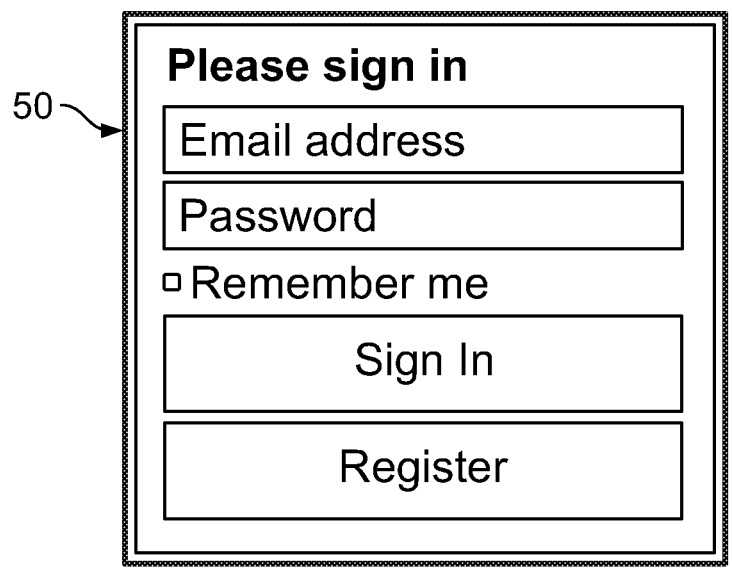
FIG. 1 is a screen shot of a sign-in screen for a system and method in accordance with an embodiment of the present disclosure.

This disclosure relates to the domain of making investments. An aspect of the present disclosure is the recognition that social information and interaction, e.g. "tips," can offer a useful and different dimension of investment information. Specifically, it may be utilized to affect those who want to invest in financial securities, as well as individuals who want to "help" others do well with investing. In accordance with the present disclosure, social computing may allow newcomers to financial trading a viable way of discovering portfolios from others who are successful at trading, while simultaneously allowing experienced traders to share their know-how and make monetary gains.

The present disclosure pertains to a new process, method, apparatus and mechanism, including a web-portal or a mobile application, which enables people interested in investing in the stock market to socially discover activities of other investors, thereby helping an individual to arrive subjectively at the answer to what securities to invest in. The portal supports two parties: (i) the "mimicker", primarily a novice investor or anyone looking to do better by learning and following, and (ii) the "mimickee", typically a seasoned investor with a proven track record that looks to profit by sharing his or her trade history.

The system and method of the present disclosure enables acts of "mimicking" and "following" investors, which simplify the act of investing for the "mimicker". The invention proposes novel ways to incentivize both the parties to participate on the portal, thereby enriching its value and utility. Other unique aspects of the present disclosure include ways and mechanisms of recommending users to watch, as well as mechanisms to implement the act of mimicking/following investors.

The technology disclosed in the present disclosure directly enables new and novice investors to quickly gauge potential investors to follow or mimic, thereby helping novice investors subjectively decide how to best invest their money. This is a different approach from services and portals on the Internet which place the onus on the investor to perform company research on their own, oftentimes in isolation and devoid of input from seasoned investors unknown to them. In the present disclosure, the decisional process is facilitated by the computer which presents data to the user, receives user input selections, presents additional responsive data that is both qualitative and quantitative in nature, e.g. providing constantly updated (real time) scoring of expert investor portfolios, details of the novice's and expert's portfolio value in real time and presents buy/sell opportunities and customized order requests/variations on a mimicked portfolio, as well as calculating the costs to the novice investor and the reward to the expert investor associated with the act of mimicking. In addition, real time information is provided to investors via an accessible data feed on investments and securities, including instantaneous stock quotes, graphing of performance of a stock, etc. to which investors can refer to support or change a proposed portfolio strategy by the expert investor that is followed or mimicked.

The present disclosure provides means for obtaining recommendations of persons who can be looked to for investment knowledge and provides them with an opportunity to learn from these more knowledgeable persons by learning through their example, i.e., observing their investment decisions. The present disclosure provides a system with a real time window on an expert investor's trades and portfolio that can be viewed by a novice investor. The novice is then presented with additional information available at their discretion and the options to actually trade based upon the objective data concerning the expert's trades and positions, as well as their own research obtained from the system. The present disclosure also describes a method and system whereby less knowledgeable investors may mimic a portfolio of a more knowledgeable person, to copy the contents of that portfolio and to subscribe to updates made in the portfolio by the more informed investor. The present disclosure describes a system and method for reducing or eliminating the barrier to entry to investment, allows less informed investors to discover investment opportunities from other, more experienced investors and facilitates executing investment transactions easier and faster.

The present disclosure proposes a system and method that provides an open network of investors who are incentivized to create investment strategies that may then be mimicked by less knowledgeable investors. The present disclosure relates to a process, method and apparatus for identifying the investment needs of a user (mentee), recommending at least one other user(s) (mentor(s)) with similar profiles who are likely better at investing. The system lets a mentee user pick an investment profile, e.g. of an experienced mentor user/investor, to follow or mimic.

Figures 8, 9:
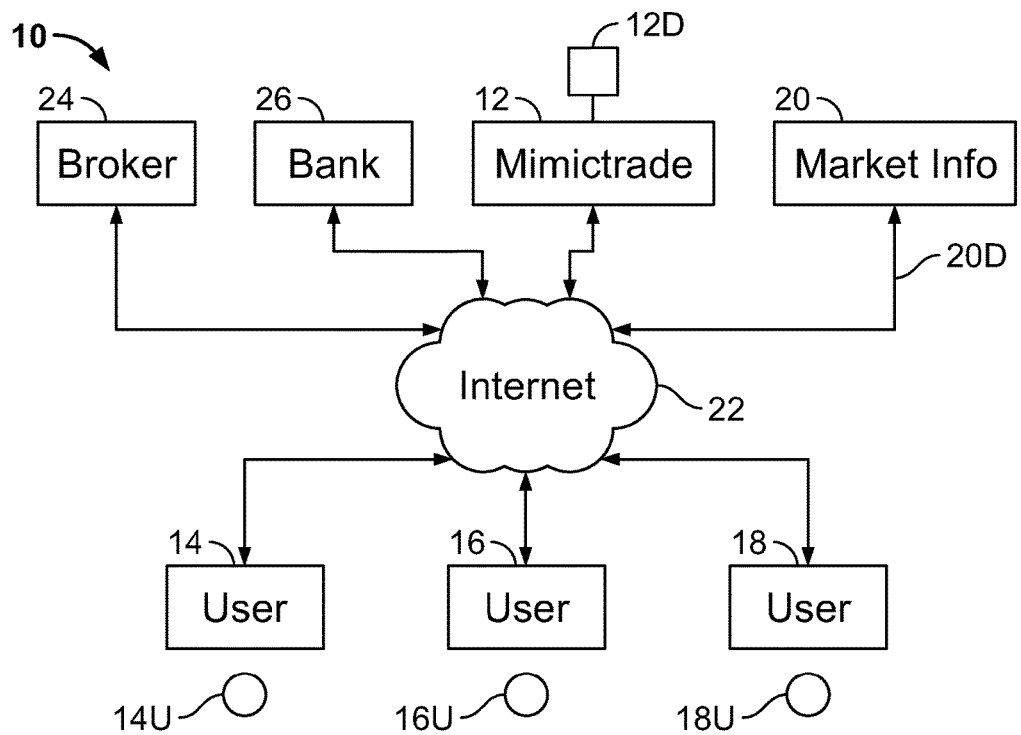
FIG. 8 is a schematic diagram of a system in accordance with an embodiment of the present disclosure.
FIG. 9 is a screen shot of a screen for users to choose basic profile information before login.

FIG. 8 is a schematic diagram of a system 10 in accordance with an embodiment of the present disclosure, wherein a server computer 12 is connected to a plurality of client computers 14, 16, 18 and to a server computer 20 which provides market data 20D, e.g. pertaining to stock, bond and commodity markets. In one embodiment, the market data 20D may be provided on a real time basis, e.g. updated every minute and the data may be provided in the form of page updates, on-screen notifications, mobile notifications, etc. The computers 12, 14, 16, 18 and 20 may be networked by a wired or wireless network 22. In one embodiment, the network may be a local network and/or may include the Internet. A server computer 24 affiliated with a licensed broker may act as a broker for purchase and sale of stocks, bonds, etc., or it may act as a simulated broker where purchases are hypothetical. A server computer 26 associated with a bank, e.g. a bank used by one or more of the users 14U, 16U, 18U, may provide banking services, e.g. transferring funds from a user's account to the broker 24 to fund purchases and receive funds generated as the result of sales by the broker 24. The server computer 12 may be provided with a program or programs for executing the system and method of investment mentoring of the present disclosure. The computer 12 may have any suitable operating system for running software on a server with any suitable processor and having any suitable hard drive array for data storage and any stable wired or wireless communication protocol for data communication to the network. The software executed on the computer 12 may be written in any suitable programming language—including C, C++, Go, Java, JavaScript, Perl, Python, Ruby—using Procedural Programming, Object Oriented Programming (OOP), or any other developmental software techniques.

The client computers 14, 16, 18 may be of any suitable operating system, including Windows, Mac OS, Unix, Linux, Android, or iOS, and may be networked to a wired or wireless network, which may include the Internet 22. In one embodiment, the client computers 14, 16, 18 have any number of suitable processors and some amount of data storage with enough space to store and operate a web browser. In one embodiment, the client computers 14, 16, 18 have suitable processing and data storage capabilities to run a dedicated software package. In one alternative, the system 10 may utilize programs residing on the client computers 14, 16, 18 for graphics functions, i.e., the system may use distributed processing techniques with the server computer 12 performing data analysis and financial calculations and the client computers executing code for graphical analysis and charting.

The data server computer 20 may be a computer owned by a commercial market data provider, such as Xignite, Bloomberg Labs, Yahoo Finance or Markit On Demand access to which is licensed freely or for a fee, or may be a data storage server that connects via API to such market data providers.

The broker server computer 24 may be a computer owned by a commercial broker, such as Interactive Brokers, TD Ameritrade, E*TRADE, or Robinhood access to which is licensed for a fee or granted through partnership.

The banker server computer 26 may be a computer owned by a commercial bank, such as JPMorgan Chase, Bank of America, or TD Bank, N.A. access to which is licensed for a fee. The banker server computer 26 may be a third-party bank processor, such as Stripe, PayPal, or Plaid access to which is licensed for a fee.

The system may be presented to users 14U, 16U, 18U via a web portal or dedicated application on Windows, OS X, Linux, iOS, Android, or other mobile and desktop operating systems. Proprietary algorithms and databases reside on a dedicated web server 12/array of web servers, which manages communications between users 14U, 16U, 18U and brokerage 24, as well as users and bank 26. Data 12D concerning users 14U, 16U, 18U, their portfolios, and carts resides in a database 12D accessible to/stored on the dedicated server(s) 12 alongside authentication information for the user's brokerage 24 and bank 26.

Figure 6:
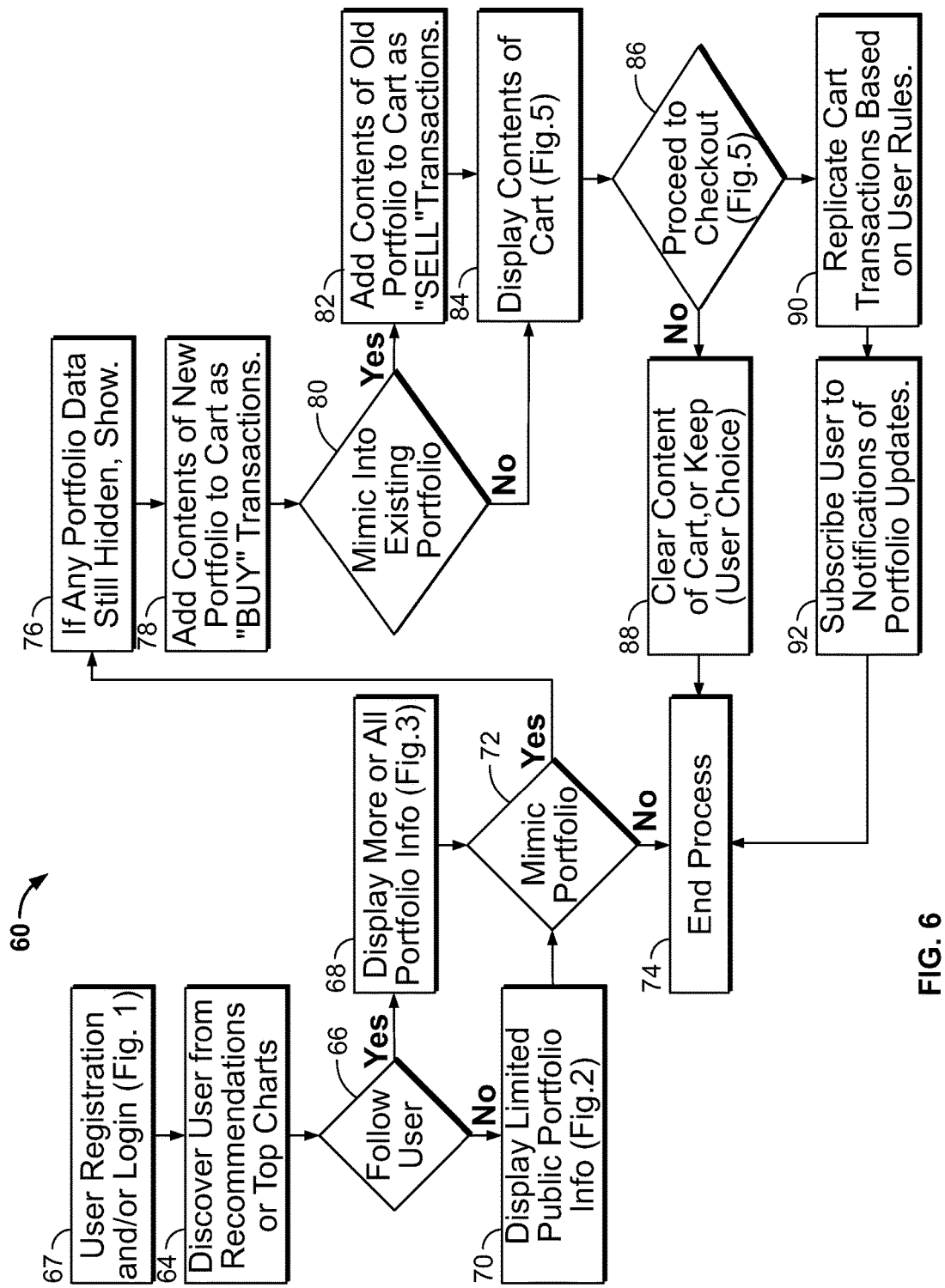
FIG. 6 is a flowchart of process steps of a method in accordance with an embodiment of the present disclosure.

As shown in FIG. 1, a user 14U, 16U, 18U may sign on to the system 10 or register via their respective client computers 14, 16, 18, using a screen 50 and follow-on screens. The basic procedural flow 60 of the system 10 is shown in FIG. 6 with sign-on/registration occurring at step 62.

Understanding a User's Investment Needs and Discovering Portfolios that Might Interest this Given User.

As shown in FIG. 9, after registration of a new user, e.g. user 18U, the system 10 portal begins by asking for information such as: (1) amount of money to invest 57, (2) risk aversion (high/low/medium) 56, (3) trading frequency that's ideal for a user (day-traders vs. long term) 55, and other such information that can help typify a user's current investment needs. FIG. 9 shows what this prompt may look like.

Beyond creating a basic profile, the system continues to learn the user 18U. This is because the user 18U might have created a profile based on what she envisions doing, but eventually ends up doing things that are completely contradictory. By tracking the user's activity, trading frequency, and current capital, the system adapts its understanding of the user 18U. This information may be learned by a voting system, where certain actions a user 18U takes will contribute to their "vote" for a particular attribute, e.g. a user who trades multiple times a day or multiple times a week will have a higher vote for day-trading.

Once a given user, e.g. 18U is understood, the system 10 may act to identify and recommend portfolios of other users, e.g. 14U, 16U that might interest this user 18U, e.g. in the event that the new user 18U is a potential mentee seeking investment advice/direction from another user 14U, 16U, who may function as a mentor. In one embodiment, any user can assume the role of mentor or mentee, in that their status is defined by their choice to follow or mimic another or the choice of another user to follow or mimic them. The process 64 that the system 10 uses to identify and recommend a portfolio/associated user, e.g. 14U, 16U (as a potential mentor) to a potential mentee user 18U involves a collaborative filtering mapping of a user's profile and investment diversification with other similar profiles, sorted by likelihood of profit.

Assume user i, who starts out with an empty portfolio P. This user starts out by creating a basic profile that captures her risk-aversion, initial capital, and expected trading frequency. As this user adds a particular stock to her portfolio, the system infers a "vote" for that stock. The mean vote for any stock within a portfolio is denoted by:

$$\bar{u}_i = \frac{1}{|I_i|} \sum_{j \in I_i} u_{i,j}$$

The system 10 now begins to compare a given user, e.g. 18U, with all existing users, e.g. 14U, 16U, their profiles, and portfolios. A pair-wise correlation between two users, e.g. 18U, and 14U is performed by employing the Pearson correlation coefficient, depicted below:

$$w(a, i) = \frac{\sum_j (v_{a,j} - \bar{v}_a)(v_{i,j} - \bar{v}_i)}{\sqrt{\sum_j (v_{a,j} - \bar{v}_a)^2 \sum_j (v_{i,j} - \bar{v}_i)^2}}$$

The Pearson correlation between two random variables is a value in the range of 1 and −1, where 1 denotes that two variables are completely correlated, and −1 denotes no correlation.

In the present case, a value of 1 between two users i and j denote that these two users have a very similar investment profile, and are likely to become followers of one another.

These discovered portfolios are further sifted through to pre-select a small handful of portfolios to actually display to the user as a result of step 64 in FIG. 6. This second level of filtering is based on the following parameters:

Success of a given portfolio, which is a moving average of percentage gains using a combination of recent success (e.g. a week, 15 days, or last month), as well as a long term track record (number of days at the portal and cumulative percentage gains).

Number of followers: A means of quantifying the helpfulness of a particular portfolio as evidenced by the number of other investors who "follow" this user.

Number of current mimickers, which is a direct measure of how many users have committed to executing trades from this particular portfolio.

These parameters are combined into a single metric that is the user's "experience", which can be represented instantaneously using the following equations:

$$E(p,f,m,t) = A\Sigma_j S(p_j) + Bf + Cm + D*UE_{t-1}$$

Where the current experience (E) is dependent on the user's portfolios (p), the user's current number of followers (f), and the user's current number of mimicker's (m), (t) is time, j refers to the first user, where S is a function for calculating a portfolio's moving average success, A, B, C, are all constants which assign weights to each parameter, A, B and C being non-zero values to avoid dropout of the associated variable and D is a constant.

The experience E and portfolio success S(p) can be cached for an amount of time determined by the frequency of updates from server 20. $UE_{t-1}$ (or, more simply, $E_{t-1}$) being the user's experience at a prior time t-1.

In one embodiment, the experience algorithm may take into account other parameters, such as account notoriety, account creation date, and last portfolio update date.

User Interactions with Discovered Portfolios; the Act of "Following"

Figure 2:
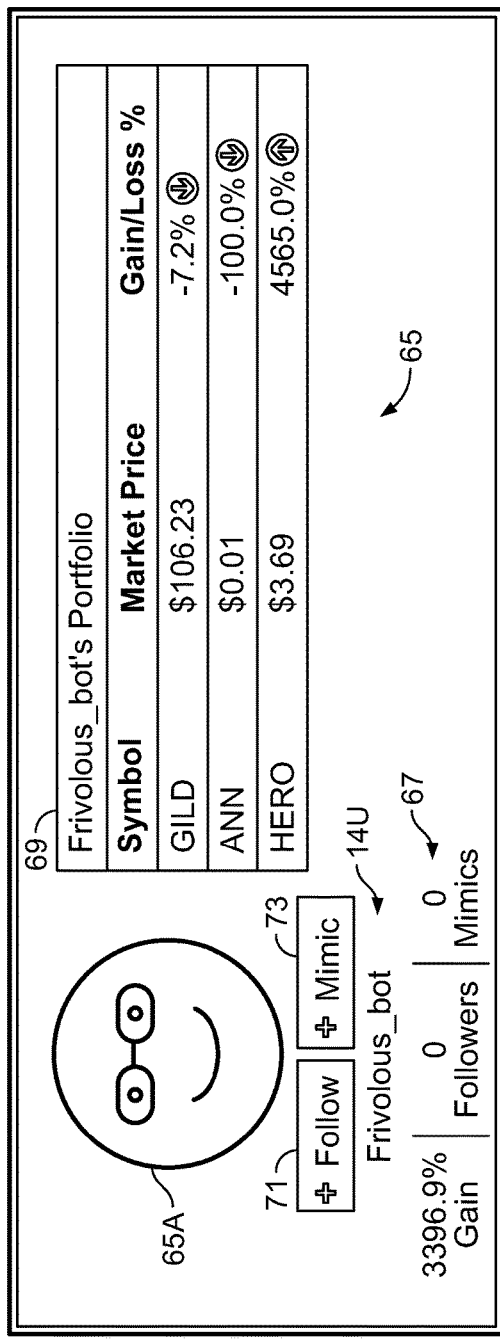
FIG. 2 is a screen shot of a screen for displaying portfolio information of an existing investor and participant in the system that may potentially be mimicked by another investor who is a member of the system in accordance with an embodiment of the present disclosure.

The system 10 at step 64 presents to the user 18U a set of other users, e.g. 14U, 16U that can be followed or mimicked. A set of displayed users may be displayed as shown in screen 65 subsection 65A as shown in FIG. 2. The screen subsection 65A allows the user, e.g. 18U to interact with the presented user, e.g. 14U by triggering the display of more details about the user, in this case user 14U with fictitious name and avatar "frivolous_bot", and statistics on herself and her investments 67. Such details may include the length of trading, the percentage gain, number of followers and mimics, and an investment profile 69. These statistics 67 may be displayed visually in text or using a multitude of graphics such as charts (including bar, pie, stacked bars etc.,) and graphs (line, dots, curves etc.).

Note that when a user profile 65A is clicked (selected) by another user, e.g. by a first time user/potential mentee, the remainder of the screen 65, i.e., portion 69 may be displayed showing selected information concerning the investment positions of user 14U. Selected investment details about the selected user 14U may be hidden from view. i.e., details of particular securities, number of stocks, and precise portfolio details are not revealed. The success of this individual user—quantified by relations to known indexes like the S&P 500 and Nasdaq, the duration of investment, as well as, a high-level overview of portfolio without enabling details may be displayed. To learn more about the portfolio, this user 14U may now be "followed" or "mimicked" by pressing virtual buttons 71, 73. The choice to follow is depicted in chart 60 of FIG. 6 as step 66 with display of additional information occurring at step 68 if following occurs or just continuing to display limited public portfolio information 70 if following is not chosen.

Figure 3:
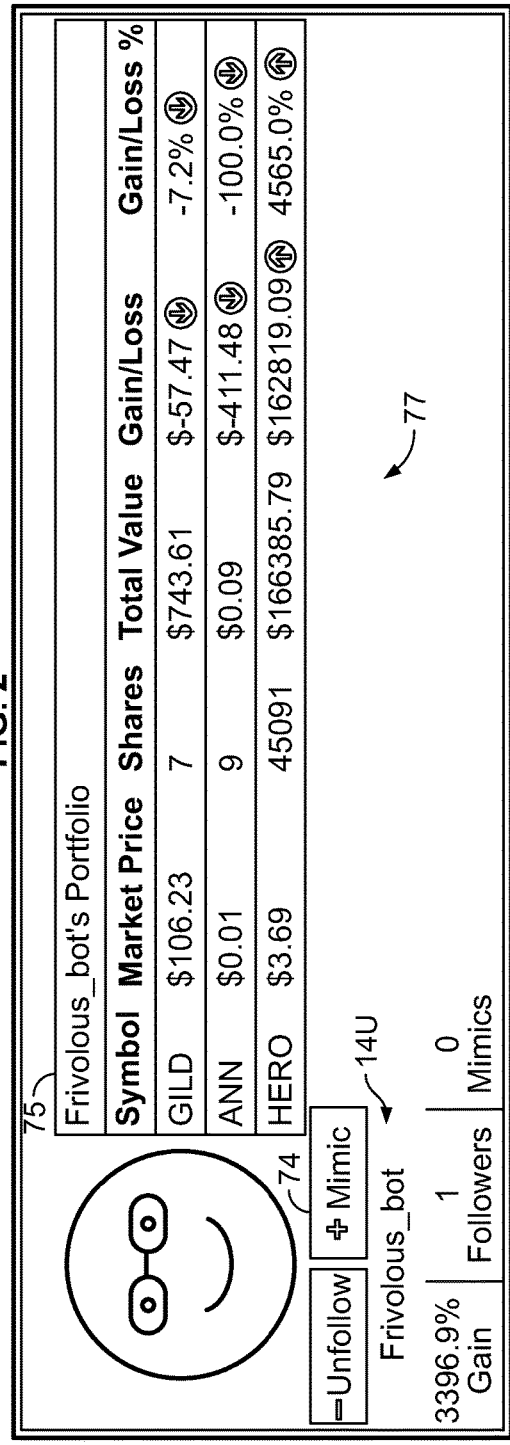
FIG. 3 is a screen shot of a screen for displaying more detailed portfolio information of an existing investor and participant in the system that may potentially be mimicked by another inventor who is a member of the system and who is "followed" in accordance with an embodiment of the present disclosure.

Follow User:

The first level of interest and interaction a potential mentee user 18U can display towards another user, such as 14U is the act of "following". As shown in FIG. 3, when a user portfolio, e.g. of user 14U is "followed", additional (but not complete) details 75 about that portfolio are now revealed in screen 77. In this stage, a high level overview 75 of the portfolio is displayed, which may include a percentage count of investment in various sectors, stocks or instruments, e.g. ETFs. Standard investment sectors such as high-tech, healthcare, consumer goods, etc. may be used to convey the investment activities. Note that details about the securities involved, such as number of stocks in any company or even the particular companies within a sector whose securities are part of the portfolio may remain unrevealed at this point.

"Following" may be interpreted as expressing a strong interest in a particular individual or her investment activities. When a user, e.g. 14U is followed, updates from that user are made available to every member who follows them. That is, when the followed user 14U buys or sells positions, these changes in positions are communicated to their "followers" (mentees). Such periodic updates could include changes in percentage gains, changes in the make-up of their portfolio based on shifting interest in various sectors, etc., which are displayed. These updates may be periodic, but are not necessarily timely. In another alternative, changes in position executed by a followed user, e.g. 14U may generate immediate updates to followers, e.g. 18U.

Mimicking User Portfolios and Trades Automatically
Mimic User:

A second, stronger level of interaction/relationship between users is evidenced in the act of "mimicking", i.e., by pressing the mimic button 74 on display 65 (FIG. 2) or 77 (FIG. 3). The option to mimic is shown in the diagram 60 as step 72 in FIG. 6. If mimicking is not selected, the process is at an end 72, i.e., no further action is taken. If mimicking is selected, more or all details of the mimicked user's/mentor's, e.g. 14U's investment portfolio may be made available to the mimickee/mentee, e.g. 18U at step 76.

Further, the mimicking user/mentee, e.g. 18U may be obliged to purchase the portfolio contents and make it part of her own portfolio. This results in adding the contents of the mimicked portfolio to a virtual "shopping cart" at step 78. The display 79 shown in FIG. 4 shows the contents of the shopping cart. The shares column 79S contains fillable/editable fields that permit the mimicking user, e.g. 18U to adjust the level of their investment in their own discretion. The cost of investing based upon number of shares and price per share is automatically calculated at column 79C. A button 79B is displayed and may be selected to proceed to checkout, i.e., to pay for the investment. Upon providing payment information, the actual purchase can be mediated using an online broker service at server computer 24 in conjunction with bank server computer 26 or can remain virtualized.

When mimicking a portfolio, there are several rules 90 a user, e.g. 18U can choose from for how to execute the new portfolio based on contents of the existing portfolio and how the new portfolio will compare to the mimicked portfolio. As shown in FIG. 6, if a user, e.g. 18U has an existing portfolio and wishes to mimic a new mentor/mimickee user, e.g. 14U, they can choose to mimic into (reconcile with) an existing portfolio 80. If that choice is made in the affirmative, the contents of the old portfolio are added to the cart as sell transactions 82. That is, any positions that the mentee user 18U has that are not reflected in the mentor user's 14U's portfolio are marked for sale to liquidate them. In one embodiment, if the existing portfolio has overlaps with the mentor user's portfolio, then whatever buying or selling of non-overlap positions that are required in order to bring the mentee's portfolio into conformity with the mentor's portfolio is automatically set up for execution. In one embodiment, this process can be executed proportionally, e.g. if the mentee's portfolio is of a smaller or greater size than the mentor's. The portfolio as shown in the buy/sell cart is displayed to the mentee user 18U at step 84 and the mentee can choose to proceed to checkout 86 with an automatically calculated total cost, as shown in display 87 in FIG. 5. In one alternative, the checkout total 87 is compared to the amount on deposit for the mentee's bank. If the total 87 exceeds the amount on deposit, the system 10 may halt the transaction and display a message to the mentee user 18U indicating that there are insufficient funds available to execute the transaction. In one embodiment, the user 18U is then provided with an opportunity to adjust the number of shares purchased in order to reduce the total 87 to a level that may be funded by the user 18U's account. If the user 18U chooses not to proceed to checkout, the cart is cleared or kept for later use 88.

In accordance with embodiments of the present disclosure, portfolios can be mimicked in various fashions, further defining user rules 90:
  making a 1:1 copy
  mimicking only the ratio of securities with smaller amounts of each security
  mimicking individual transactions/ideas from multiple investors
  combining multiple portfolios to create a sum-of-best-from-all portfolio.

If checkout is selected, the cart transactions are replicated based on user rules 90. In addition, the mentee user 18U may be automatically subscribed to notifications when their mentor user's portfolio is updated/changed 92.

Figure 7:
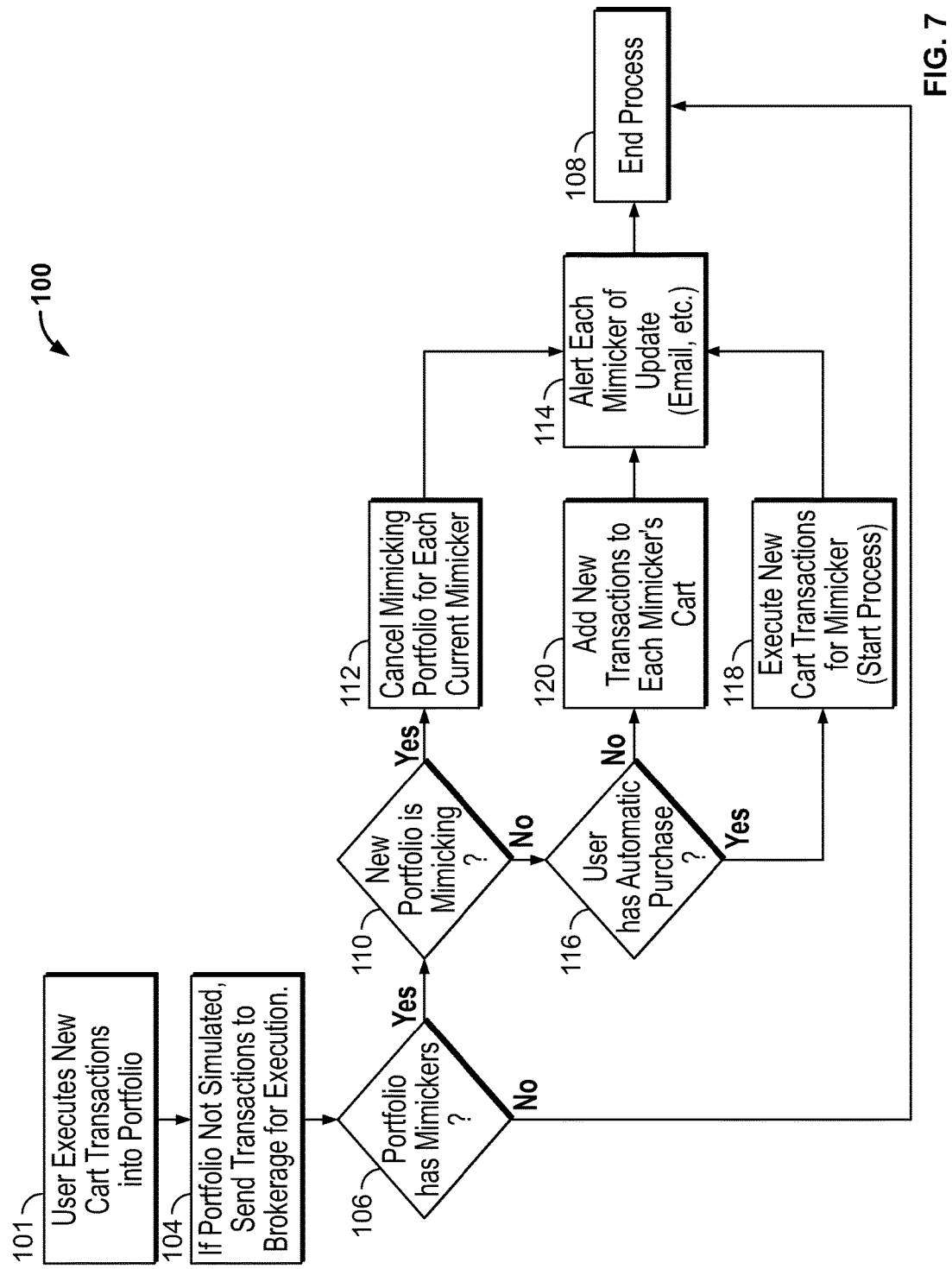

FIG. 7 shows a chart 100 of actions taken at the server computer 12 in response to checkout of a user's cart at step 90 in FIG. 6, which is replicated as step 102 in FIG. 7. As indicated, if the user, e.g. 18U has mimicked another user's portfolio for the purpose of trading in actuality and not simply as a simulation for educational or testing purposes, the transactions pursuant to mimicking may be communicated to a brokerage for execution 104, e.g. using the Internet. At 106, a check is made to see if the portfolio submitted for execution at step 104 has mimickers. If not, the process if ended 108. If so, at 110 a check is made if the mimicking portfolio is a new portfolio. If it is a new portfolio, the mimicking portfolio is cancelled for each current mimicker 112 and an alert is sent 114 to each mimicker informing them of the update in the portfolio that has been executed at step 104. If the mimicking portfolio was not new at step 110, a check is made at step 116 as to whether the mimicking portfolio has been set by its mentee owner/user, e.g. 18U to automatically execute purchases to maintain the mimicking (without their further review of intervention). If so, a new cart of transactions needed to maintain the mimicked state is prepared for the mimicker and is executed 118 (sent to the broker 24). A notice of the changes made is then sent 114 to the mimicking user. In the event that automatic purchasing has not been enabled as checked at step 116, then the new transactions needed to maintain a mimicked state are added to the mimicker's cart 120 and a notice is then sent to the mimicking user 114 to apprise them of the change and allow them to inspect, change or approve the execution of the transactions in the cart.

As part of the conditions for participating in/using the system 10 and to incentivize mentor users 14U, the mimicker user/mentee 18U may be obliged to pay fees, e.g. a small percentage of gains made on the mimicked portfolio to the mimickee/mentor user 14U. Updates from the mimickee, such as changes in the portfolio, may trigger a push alert to all mimickers. These updates may be both periodic and/or timely. Such a push alert may automatically populate mimicker user's cart(s) as well as notify the mimicking user 18U that a change in their mentor's portfolio has occurred. Further, the mimicker now has a chance to review the changes and update her portfolio based on the changes by the mimickee. An aspect of the present disclosure is a limbo phase which gives the mimicker an option to continue with the updates or let one slide (skip it). The mimicker is free to enable auto portfolio update, wherein changes to a portfolio by a mimickee are automatically reflected in the mimicker's portfolio without human intervention. In accordance with one aspect of the present disclosure, the system may specify that as long as the mimicker continues to hold the same portfolio when first mimicked, the mimicker continues to pay a small percentage of her gains to the mimickee on a timely basis.

In accordance with aspects of the present disclosure, new users may join the system 10 portal and choose some base-settings, including spending bracket, basic trading strategy, and other parameters. Thereafter, the portal uses a collaborative filtering algorithm to arrange portfolios into "buckets" and chooses the appropriate bucket that is within the user's parameters. This bucket is then sorted, taking into account overall user performance since joining the portal, portfolio performance since portfolio creation, age of account, notoriety, and time since last transaction, so that a subset representing the "best" of these portfolios is displayed to the new user. Users on the portal may be presented with the options of making a portfolio, or "mimicking" a portfolio. Making a portfolio involves dumping a set of securities into a cart on the portal. Once this cart is "checked out," a transaction may be invoked with an external brokerage to execute the trade(s), and once confirmed, the portal stores a copy of the portfolio in a database of known portfolios. It is this database that is used in the recommendation algorithm described above. Users who "mimic" a portfolio existing in the database will have a "mimic" of the original portfolio dumped into that user's cart.

This "mimic" can be done following any of the user rules 90 (1:1 copy, copying of ratio of securities, etc.). Assuming the user has not modified the cart and goes to "check out" the cart, a transaction may be invoked with an external brokerage to execute the trades, the user's portfolio is added to a separate subset of portfolios that is not used in the recommendation algorithm, and the user is "subscribed" to updates on the original portfolio. When the owner of an original portfolio adds more securities to their cart and checks out, the set of other users who are subscribed to the portfolio will receive an alert of said transaction and have the securities from the original transaction duplicated in their own cart. Thereafter, each user will choose to either check out their cart, or unsubscribe from "mimicking" the original portfolio. Choosing to check out the cart updates the "mimicker's" portfolio and invokes an identical transaction with the brokerage for that user, as well as keeps the user on the list of "subscribers" for the original portfolio. Choosing to unsubscribe removes the individual from updates to the original portfolio and their portfolio is now a unique derivative of the original portfolio, where it is added to the pool of portfolios that can be recommended.

Aspects of the present disclosure include allowing well-versed and/or skilled investors to assemble portfolios of securities for various spending brackets on the system 10 portal. The contents of these portfolios are made public to registered users of the portal. Users may select a spending bracket and various other parameters, and be recommended portfolios based on performance from the database of skilled investor portals. Thereafter, users will choose to "mimic" a portfolio that they feel is within their price bracket and performs to their standards. This "mimicked" portfolio is either an identical copy to the original portfolio or has an identical ratio of each security to the original portfolio, and will be kept updated to the original portfolio with only minimal interaction from the "mimicking" user.

Users can compete to have higher-performing portfolios/collections of securities and be rewarded for doing better. Data analysis can be performed on user transaction history to speculate trends. Analysis can be done on current trends to recommend not only user and portfolios, but also individual securities. The approaches of the present disclosure may be used to bring down or eliminate the barrier of entry into investment. The portal allows people to learn investing by example, and even while they are learning they can begin to invest without the difficult setup involved conventionally. By discovering people, and by looking at their investment activities and their portfolios, users can learn what stock to buy without being well-versed at investment, and then can initiate transactions with minimal interactions.

Investors often rely upon reading and learning about securities manually, and making best guesses at changes in the market. Using the portal of the present disclosure adds another element of interaction where users can find and discover other users in the portal, and use the cumulative knowledge derived therefrom to make more informed purchasing decisions. Instead of spending hours finding news, one can use the top portfolios of the day/week/month to get a grasp on what the trends are. The process and apparatus of the present disclosure makes it easier to find what stocks to buy, and easier to execute involved transactions with little user interaction.

The accuracy of the algorithms rely on a database of skilled investors. This is overcome by offering monetary incentives to having a portfolio "mimicked"—a user choosing to "mimic" a portfolio will pay a small commission on the portfolio's price, part of which will be deposited to the original portfolio owner's bank account. In a subscription based model alternative of the present disclosure, a user pays a monthly subscription to access the portal of users and portfolios. In an alternative, commission-based model, users pay an amount extra to mimic a portfolio, a portion of which goes to the original portfolio owner and a portion of which is taken as profit. The system 10 of the present disclosure may be of interest to financial institutions, e.g. brokerages, in that the system encourages trading at a higher frequency as well as provides a means for one trade to multiply into several more trades right after the execution of an original trade. More trading means more money flowing, representing a profit opportunity for brokerages, as well as users of the system 10.

We claim:

1. An automated system implemented on a server comprising:
    a processor and a non-transitory computer readable medium coupled to the processor, wherein the non-transitory computer readable medium stores program instructions executable by the processor for investing in financial securities useable by a plurality of users, comprising:

a trader grouping graphical user interface displaying data fields to the plurality of users allowing entry of user profile data, including at least one selected from the group of risk aversion, available trading capital and trading frequency;

a trader grouping engine displaying the trader grouping graphical user interface to the plurality of users, receiving the user profile data entered, storing the user profile data in a database and comparing the user profile data between different users to ascertain a measure of similarity between a plurality of users and grouping at least two users based upon the measure of similarity between the profile data of a first user and a second user and upon a user experience value attributed to the first user;

a trading graphical user interface displaying financial security identification and pricing information and data entry fields, including a blank for number of securities bought/sold that may be filled by the first user in making a buy/sell order;

a trading engine displaying the trading graphical user interface to the first user, allowing the first user to enter trading data for a trade of financial securities, recording the trading data in a trading database and executing the trade by communicating the trading data associated with the trade to a trading agent who executes the trade for the first user where the executed trade is further recorded in the trading database, the executed trade contributing to: a record of profit/loss attributed to the trading activity of the first user and a portfolio of the first user which are presented to the second user as criteria for deciding whether to mimic the trading activity of the first user;

a profit/loss calculation engine that calculates the record of profit/loss associated with at least one trade by the first user and stores the record of profit/loss in the trading database;

a trading activity reporting engine that identifies the second user that has been grouped with the first user by the grouping engine and displays to the second user on a display screen: a first portion of the first user's trading activity data including an identifier for the first user and the record of profit/loss associated with the trading activity of the first user and presenting a message to the second user inviting the second user to elect to receive further data concerning the first user's trades and upon electing to receive further data, a relationship is established between the first user and the second user in which the second user has access to the first user's trading data beyond the first portion of the trading activity data, the relationship establishing the second user as a mimicker with the ability to mimic the first user's trading activity, the trading activity reporting engine calculating the user experience value indicative of trading success of the first user wherein a first user's success E is calculated using the following factors related by the following equation: $E(p,f,m)=\Sigma S(p)+Bf+Cm$, where E is dependent on the first user's portfolio (p), the first user's current number of followers (f), and the first user's current number of mimickers (m), and where S is a function for calculating a portfolio's moving average success, and B and C are non-zero, weight constants; and a trade mimicking engine, the trade mimicking engine presenting the first user's trading data to the second user via a trade mimicking graphical user interface, which displays the first user's trading data including investment changes made during the trade, including identifying the financial securities traded along with the numbers of financial securities traded, the trade mimicking engine through the trade mimicking graphical user interface providing the option to the second user to mimic the first user's trade in whole or part and based upon the second user's selections entered into the trade mimicking graphical user interface, the trade mimicking engine automatically executing the resultant trade for the second user.

2. The system of claim 1, wherein the first user's trade is optionally mimicked proportionally in making the second user's trade.

3. The system of claim 2, wherein the proportion is 1:1, such that the first user's portfolio and trades are mimicked entirely.

4. The system of claim 2, wherein the proportion is 0:1, such that the first user's portfolio and trades are not mimicked at all.

5. The system of claim 1, wherein the grouping engine utilizes pair-wise correlation employing the Pearson coefficient ranging from −1 to 1, with −1 indicating no correlation and 1 indicating complete correlation.

6. The system of claim 1, wherein a plurality of other users can be mimicked by a user, such that the mimicked portfolio and trading activities are an amalgam of portfolios and trades.

7. The system of claim 1, wherein a user can mimic any other given user or a plurality of other users.

8. The system of claim 1, wherein the system is accessed by a web portal.

9. The system of claim 1, wherein the system is accessed by a mobile application.

10. The system of claim 2, wherein the grouping engine filters users grouped together by another metric from at least one selected from the group of account notoriety, account creation date and portfolio update date the user's experience value.

11. The system of claim 1, further comprising a broker connected to the system for executing trades.

12. The system of claim 1, further comprising a bank connected to the system for dispensing funds to execute trades and receiving proceeds of trades.

13. The system of claim 1, wherein the trades are conducted without actual money.

14. The system of claim 1, wherein the relationship represented by data stored in the relationship database allows the other user to view the first user's trades but does not trigger the trade mimicking engine.

15. The system of claim 1, further comprising a compensation engine that calculates compensation to the first user for trades conducted by users who are in a mimicking relationship with the first user and who make trades that mimic the first user's trades.

16. The system of claim 1, wherein the first user's success E is calculated in accordance with the following equation, $$E(p,f,m,t)=A\Sigma_j S(p_j)+Bf+Cm+D^*E_{t-1}$$

where (t) is time, j refers to the first user, A is a non-zero weight constant, D is a constant and $E_{t-1}$ is the first user's success at prior time t-1.

17. The system of claim 1, further comprising a notification engine, the notification engine generating a notification and trading data to users that are in a relationship with the first user when the first user executes a trade.

* * * * *